US006903316B2

(12) United States Patent
Kivisto

(10) Patent No.: US 6,903,316 B2
(45) Date of Patent: Jun. 7, 2005

(54) METHOD AND APPARATUS FOR INDUCTION HARDENING

(75) Inventor: Brian Kivisto, Dassel, MN (US)

(73) Assignee: Forward Technology, Minneapolis, MN (US)

( * ) Notice: Subject to any disclaimer, the term of this patent is extended or adjusted under 35 U.S.C. 154(b) by 0 days.

(21) Appl. No.: 10/608,847

(22) Filed: Jun. 27, 2003

(65) Prior Publication Data

US 2004/0031787 A1 Feb. 19, 2004

Related U.S. Application Data

(60) Provisional application No. 60/392,345, filed on Jun. 28, 2002.

(51) Int. Cl.$^7$ .................................................. H05B 6/06
(52) U.S. Cl. ........................ 219/635; 219/601; 269/49
(58) Field of Search ................... 219/635, 601, 219/639, 656; 266/129, 131, 125, 124; 148/328, 572; 269/239, 336, 49, 30, 114, 145, 224, 227, 254 R; 29/244; 474/8; 73/78

(56) References Cited

U.S. PATENT DOCUMENTS

| 3,648,995 A | * | 3/1972 | Seyfried et al. ............ 266/124 |
| 3,738,636 A | | 6/1973 | Reinke et al. |
| 4,321,097 A | * | 3/1982 | Kerr ........................... 148/239 |
| 6,270,596 B1 | * | 8/2001 | Iguchi et al. ............... 148/572 |
| 6,605,163 B2 | * | 8/2003 | Cozar et al. ................ 148/336 |

* cited by examiner

Primary Examiner—Quang T. Van
(74) Attorney, Agent, or Firm—Patterson, Thuente, Skaar & Christensen, P.A.

(57) ABSTRACT

An apparatus and method for induction hardening a workpiece can first include fastening a workpiece in a clamping assembly. The clamping assembly is provided with a plurality of hardness testing devices. Alternatively, one or more hardness testing devices are provided directly to the induction hardening head. The induction hardening head is moved over the workpiece to harden a portion thereof, such as an edge. Then, a series of hardness measurements are taken with the plurality of hardness testing devices to allow an operator or controller to adjust the input to the induction hardening head. This allows the workpiece to be provided with a predetermined hardness profile within a desired tolerance.

13 Claims, 5 Drawing Sheets

METHOD AND APPARATUS FOR INDUCTION HARDENING

REFERENCE TO RELATED APPLICATIONS

This application claims the benefit of priority to U.S. provisional application 60/392,345, filed on Jun. 28, 2002, which is hereby incorporated by reference in its entirety.

FIELD OF THE INVENTION

The present invention relates to a method and apparatus for induction hardening workpieces, and more particularly to a method and apparatus for maintaining a consistent hardness profile for an elongated workpiece.

BACKGROUND OF THE INVENTION

The present invention relates to a method and apparatus for induction hardening elongated objects such as cutting blades for use in the manufacture of cardboard and paper materials. The manufacture of paper and cardboard often requires predetermined lengths of such materials to be cut by automated cutting machinery. This machinery employs elongated tubular cylinders having a plurality of knives or blades fastened thereto. Each knife blade comprises an elongated rectangular steel member having a sharpened edge. It is desired to provide an edge that stays sharp for the longest amount of time possible since blade replacement or refurbishment adds to the cost of manufacturing end products.

The conventional method for providing an extended life sharp edge is to induction harden the edge of the blade. However, one must ensure a consistent hardness profile across the length of the workpiece to prevent uneven wear, which would compromise the blades cutting abilities. Conventionally, an operator must periodically remove the blade at predetermined intervals during an induction hardening procedure and manually measure the hardness value. The primary disadvantage of this method is that it takes additional time for the steps of removing and re-securing the workpiece each time a measurement is taken. These additional steps prolong the manufacturing time and add to the labor costs. Additionally, by increasing frequency of the measurements (resolution) to increase the hardness consistency over the length of the workpiece, adds even more to the costs. Therefore, there is a continuing need to reduce the time and cost required to produce a cutting blade having a hardened edge that has an approximately uniform hardness value.

SUMMARY OF THE INVENTION

An apparatus and method for induction hardening a workpiece that addresses the disadvantages of the prior art is disclosed. When using the apparatus, the method may first comprise the fastening a workpiece in a clamping assembly. The clamping assembly is provided with a plurality of hardness testing devices. Alternatively, one or more hardness testing devices are provided directly to the induction hardening head. The induction hardening head is moved over the workpiece to harden a portion thereof, such as an edge. Then, a series of hardness measurements are taken with the plurality of hardness testing devices to allow an operator or controller to adjust the input to the induction hardening head. This enables the workpiece to be provided with a predetermined hardness profile within a desired tolerance, without the necessity of removing and re-mounting the workpiece.

DETAILED DESCRIPTION OF THE PREFERRED EMBODIMENTS

Figure 1:
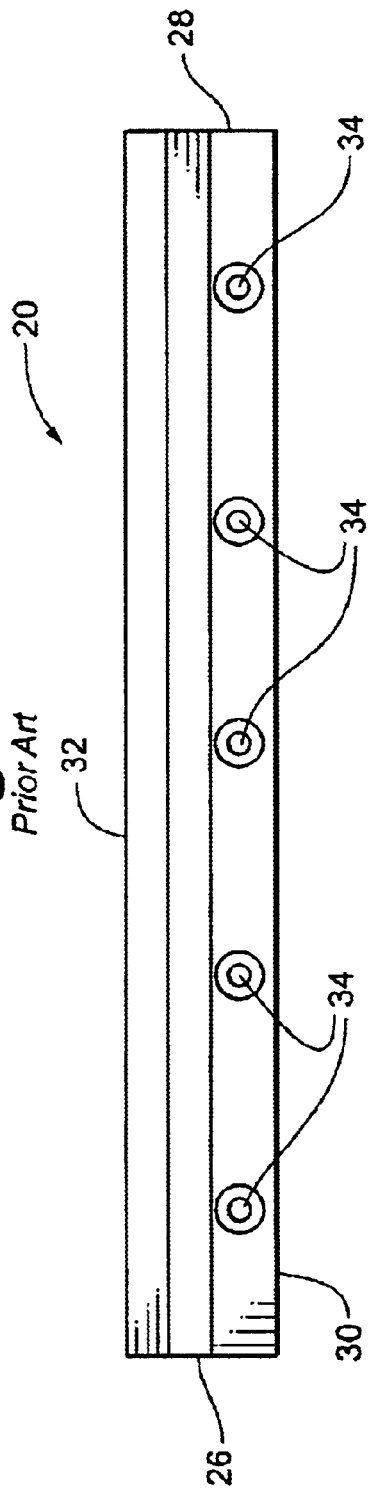
FIG. 1 is a side view of a knife blade according to the prior art.
Figure 2:
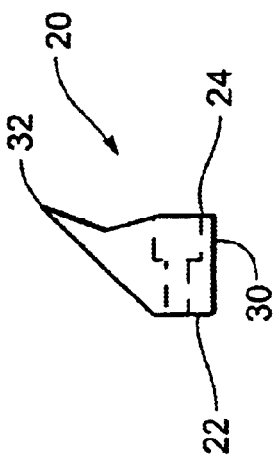
FIG. 2 is an end view of a knife blade according to the prior art.

FIGS. 1 and 2 illustrate a side view and end view of a knife blade 20, respectively, for cutting paper and cardboard products in automated production machinery. Each blade 20 comprises a first side 22, a second side 24, a first end 26, a second end 28, a bottom surface 30, and a cutting edge 32. A plurality of mounting holes 34 are provided to the blade 20 in communication with both of the first 22 and second 24 side surfaces.

The sharpened edge 32 is preferably hardened during the blade's manufacturing process to provide for a longer lasting sharp edge. Once the edge 32 is no longer sufficiently sharp to adequately cut the paper or cardboard products, it must be replaced and refurbished. Thus, it is desirable to achieve the longest lasting edge sharpness possible, thereby minimizing downtime and the associated costs of blade replacements and/or blade refurbishing. To that end, the cutting edge is hardened by the process of induction hardening. U.S. Pat. No. 3,738,636, hereby incorporated by reference, discloses a typical induction hardening apparatus for holding and induction hardening elongated workpieces.

Figure 3:
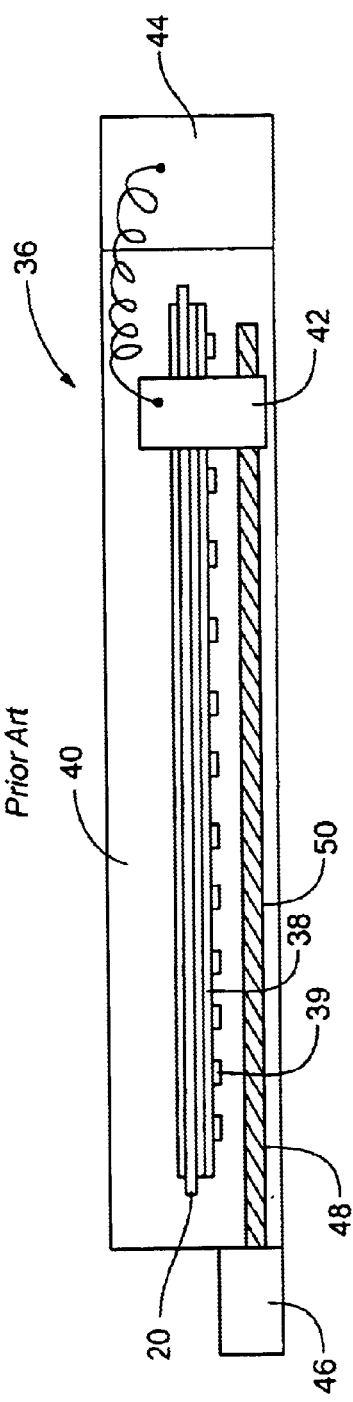
FIG. 3 is a top view of an induction hardening apparatus for induction hardening a knife blade according to the prior art.
Figure 4:
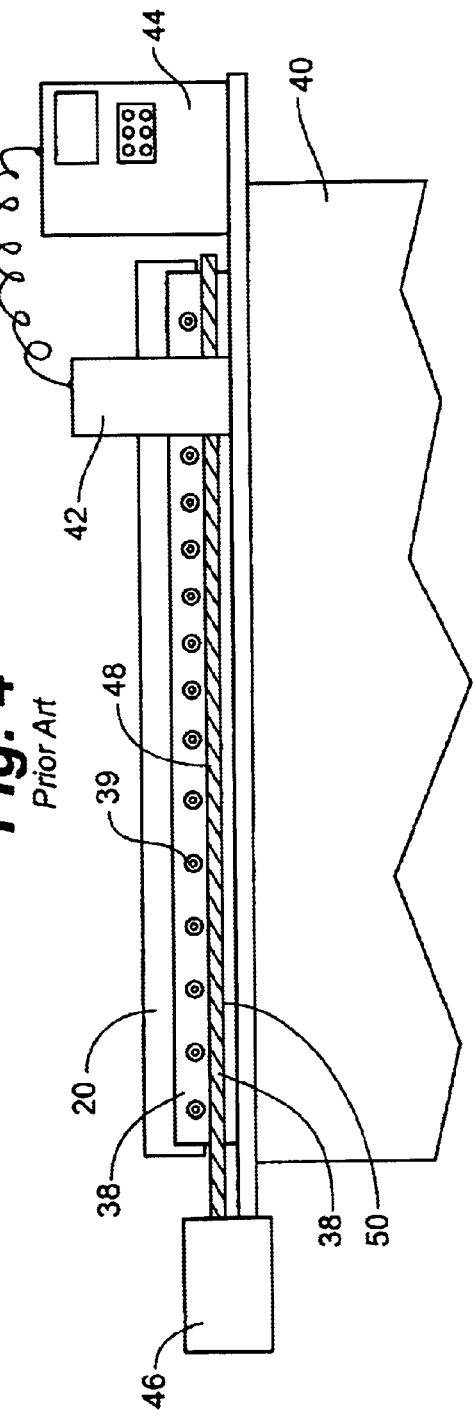
FIG. 4 is a side view of an induction hardening apparatus for induction hardening a knife blade according to the prior art.

FIGS. 3 and 4 illustrate a respective top view and side view of a conventional induction hardening apparatus 36 for knife blades 20 used in the paper and cardboard manufacturing industry. A clamping assembly 38 is disposed on a base 40 for clamping the blade 20 during a hardening procedure. The clamping assembly 38 includes a plurality of fasteners 39 that hold the position of the blade 20 in place during a hardening procedure. An induction hardening head 42 is slidably mounted to a portion of the clamping assembly 38 so that the cutting edge 32 of the blade 20) may be induction hardened. Power for the induction coil (not shown) in the hardening head 42 is supplied by an induction controller 44. A control motor 46 rotates a shaft 48 having threads 50 thereon, which communicate with the induction head 42. Such communication allows controller 44 to controllably move the induction head 42 along the length of the blade 20 during an induction hardening procedure.

A blade 20, having been induction hardened along its cutting edge 32, provides a longer edge life compared to a blade that was not induction hardened. However, mere induction hardening the edge will result in uneven wear due to hardness variations along the blade's length. Therefore, there is a need to adjust the input voltage to the induction hardening device 36 in order to maintain a consistent hardness measurement (often measured as a Rockwell C value) along the length of the cutting edge 32 of the blade 20.

Figure 5:
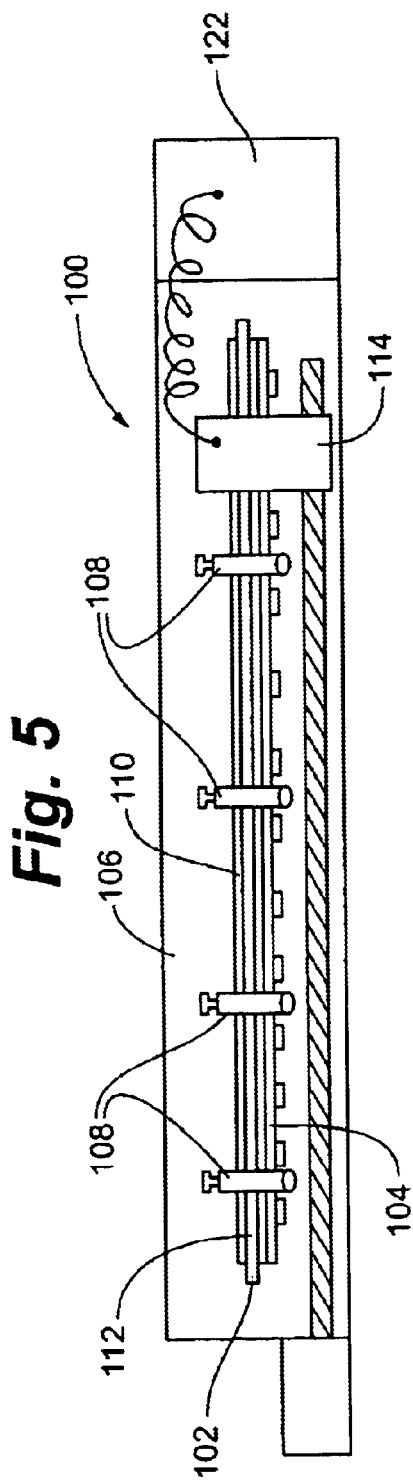
FIG. 5 is a top view of an induction hardening apparatus for a knife blade according to an embodiment of the present invention.

Referring to FIG. 5, an induction hardening apparatus 100 according to an embodiment of the present invention is shown in a top plan view. A workpiece 102 is rigidly held in place by a clamping assembly 104. The clamping assembly 104 is disposed atop a base 106, thereby elevating the hardening apparatus to an ergonomically desirable height for an operator. A plurality of manual hardness testing devices 108 are provided to the clamping assembly 104 at spaced intervals along the length of the blade 102. The hardness testing devices 108 are rigidly fastened to a first portion 110 of the workpiece clamping assembly 104, and disposed over the sharpened edge 112 of the blade 102. The measuring devices 108 may be fastened to the clamping assembly by threaded fasteners provided to a bracket fastened to the measurement devices 108.

A wide variety of commercially available manual hardness testing devices may be utilized in the above-described configuration. Rockwell C hardness testing devices are widely available and known to those having skill in the art. Suitable hardness testers are available from companies such as Ames. Suitable Ames Hardness testers may be purchased from Qualitest™ USA LC, 3706 N. Ocean Blvd., #200, Ft. Lauderdale, Fla. 33308, USA. Alternative types of hardness testing instruments may be used without departing from the scope of the present invention, such as Brinell hardness testing devices.

A greater number or lesser number of hardness testing instruments 108 may be provided to the clamping assembly 104 according to the present invention. For instance, five, six or more hardness testing devices may be disposed on the clamping assembly to provide a greater resolution of the hardness profile for the blade edge 112.

Figure 6:
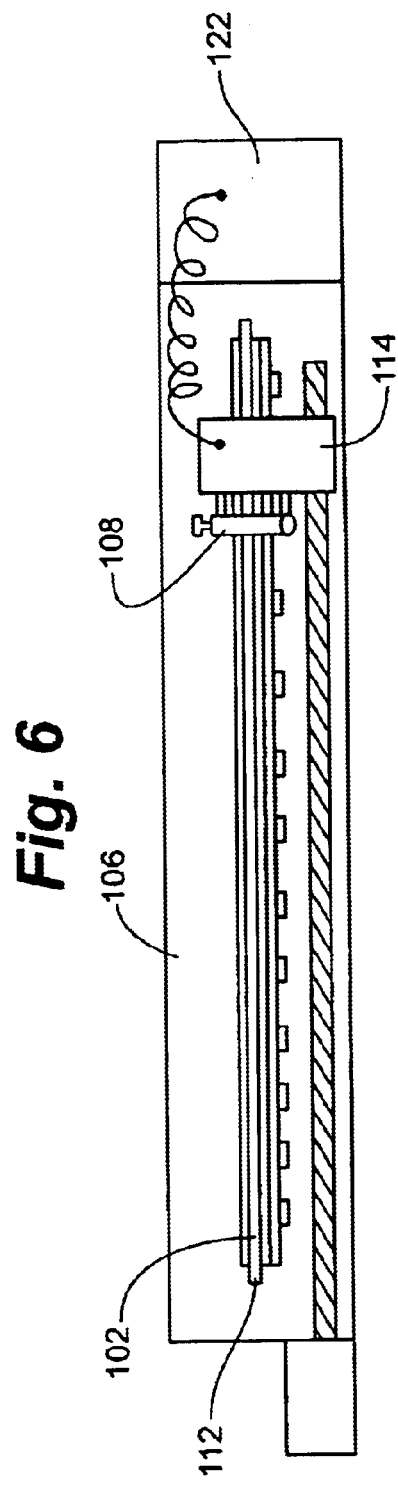
FIG. 6 is a top view of an induction hardening apparatus for a knife blade according to an embodiment of the present invention.

Referring to FIG. 6, another embodiment of the present invention provides the hardness testing device 108 directly to the induction hardening head 114. By providing the hardness tester 108 to the induction hardening head 114, a hardness reading may be taken at any number of infinite points along the length of the workpiece 102. The operator then uses the hardness measurement to adjust the voltage supplied to the induction hardening coil up or down, depending on the hardness value relative to a target value. The goal is to maintain a consistent hardness measurement throughout the length of the workpiece 102.

Figure 7:
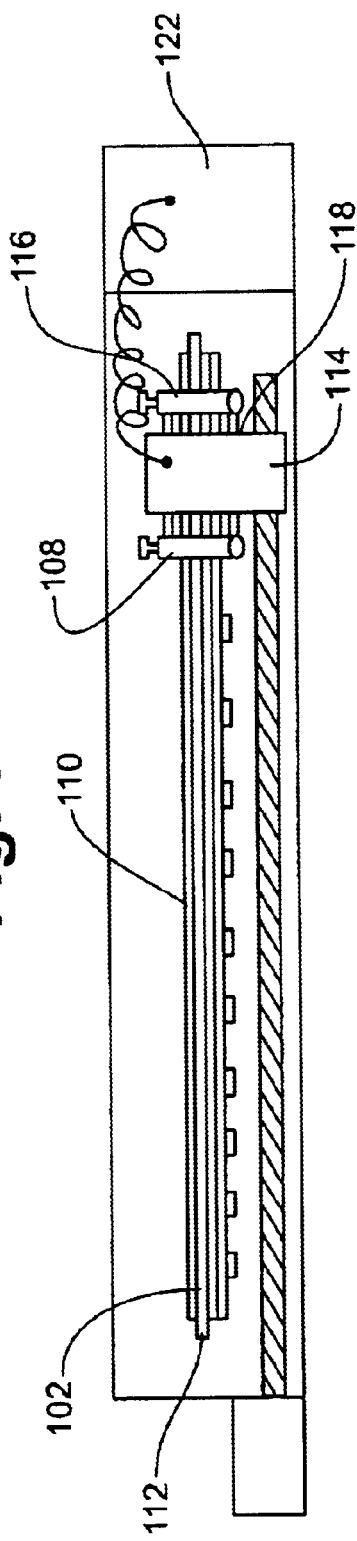
FIG. 7 is a top view of an induction hardening apparatus for a knife blade according to an embodiment of the present invention.

Referring to FIG. 7, a second hardness measurement device 116 is provided to the backside 118, or following side, of the induction hardening head 114. The additional hardness testing device 116 allows the operator to take a hardness measurement after the induction head 114 passes in order to ensure that the edge 112 is hardening to the target value and that the induction hardening apparatus 100 is in correct working order.

Figure 8:
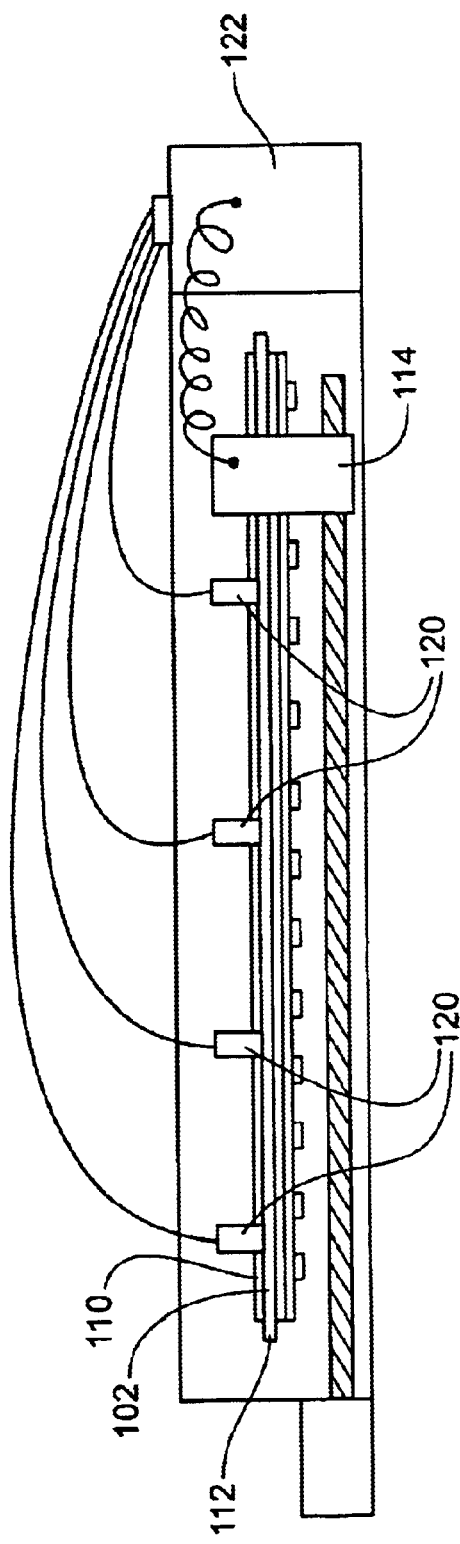
FIG. 8 is a top view of an induction hardening apparatus for a knife blade according to an embodiment of the present invention.

Referring to FIG. 8, a plurality of automated hardness testing devices 120 are disposed along the clamping assembly 104. Each of the automated hardness testing devices 120 is in electrical communication with a programmable controller 122. The programmable controller 122 obtains a hardness reading from each of the sensors 120 and adjusts the voltage to the induction coil in the head 114 accordingly, to achieve a uniform target hardness value for the workpiece 102.

Figure 9:
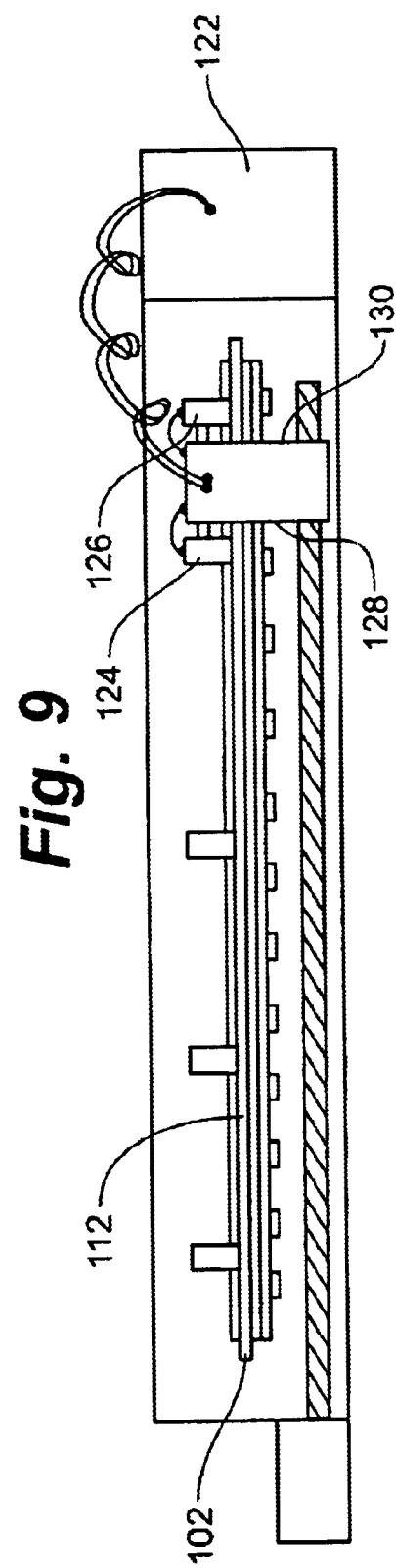
FIG. 9 is a top view of an induction hardening apparatus for a knife blade according to an embodiment of the present invention.

Referring to FIG. 9, first 124 and second 126 automated hardness measurement devices are rigidly fastened to a respective forward side 128 and following side 130 of the induction hardening head 114. Such positioning allows up to an infinite number of successive hardness readings to be taken prior to the induction hardening head 114, passing a given point and, following the induction hardening head 114, passing that same point. The hardness measurements are relayed back to the controller 122, which then adjusts the voltage input to the induction coil in the head 114 to achieve a predetermined desired hardness value of the workpiece 102. Additionally, the information supplied by the following hardness sensor 126 allows the controller 122 to alert the operator when it encounters a condition in the workpiece not within a predetermined tolerance.

A wide variety of commercially available computer interfaceable hardness testers may be utilized in the automated measurement embodiments. Suitable hardness measuring devices are available from companies such as Newage Testing Instruments, Inc., 147 James Way, Southampton, Pa. 18966, USA.

In operation, an operator enters a predetermined desired hardness value into a programmable controller 122, which is in electrical communication with the induction hardening head 114 and hardness measurement devices 108 or 120. The induction hardening process is begun at a first end of the workpiece 102 and proceeds towards the remote end. The forward hardness sensor 124 takes readings at predetermined intervals and relays that information back to the controller 122. The controller 122 is programmed with an algorithm that adjusts the voltage input to the induction coil in the induction head 114 either up or down depending on a hardness value higher or lower than a target value for the unhardened workpiece 102. The hardness sensor 126 following the induction head 114 takes hardness readings at predetermined intervals to create a hardness profile for the length of the workpiece 102.

The controller 122 can use the profile information to sense whether the predetermined hardness value for the finished piece has been achieved. The profile of the entire length of the workpiece can also be inspected by an operator or analyzed by an automated device to determine whether the finished product meets certain quality standards.

Although the present invention has been described with reference to the preferred embodiments, workers skilled in the art will recognize changes may be made in form and detail without departing from the spirit and scope of the invention.

I claim:

1. A method for induction hardening a workpiece comprising the steps of:

fastening a workpiece in a clamping assembly;

providing a first hardness testing device to a forward side of an induction hardening head;

moving the induction hardening head over the workpiece to induction harden the workpiece;

taking a plurality of forward hardness measurements of the workpiece with the first hardness testing device; and adjusting the induction hardening head to provide a predetermined hardness profile to the workpiece.

2. The method of claim 1, further comprising the step of providing a second hardness testing device to a following side of the induction hardening head.

3. The method of claim 2, further comprising the step of relaying the plurality of forward hardness measurements to a controller.

4. The method of claim 2, further comprising the step of taking a plurality of following hardness measurements of the workpiece with the second hardness testing device.

5. The method of claim 4, further comprising the step of relaying the plurality of following hardness measurements to a controller.

6. A method for ensuring a consistent hardening profile for an induction hardened workpiece, the method comprising the steps of:

providing a first hardness testing device to a forward side of an induction hardening head;

moving the induction hardening head over the workpiece to induction harden the workpiece;

taking a plurality of forward hardness measurements of the workpiece with the first hardness testing device;

providing the plurality of forward hardness measurements to a controller; and adjusting the induction hardening head to provide a predetermined hardness profile to the workpiece.

7. The method of claim 6, further comprising the steps of:

providing a second hardness testing device to a following side of the induction hardening head;

taking a plurality of following hardness measurements of the workpiece with the second hardness testing device;

providing the plurality of following hardness measurements to the controller; and generating a fault signal for each of the plurality of following hardness measurements failing outside of a predetermined range.

8. An apparatus for induction hardening an elongated workpiece, the apparatus comprising:

an induction hardening assembly slidably connected to a base for induction hardening an edge of the workpiece;

a first hardness measuring device disposed on a forward side of the induction hardening assembly; and a second hardness measuring device disposed on a following side of the induction hardening assembly.

9. The induction hardening apparatus of claim 8, wherein the first hardness measuring device and the second hardness measuring device are both manual-type devices.

10. The induction hardening apparatus of claim 8, wherein the first hardness measuring device and the second hardness measuring device are automated-type devices.

11. The apparatus of claim 10, wherein each of the first hardness measuring device, the second hardness measuring device and the induction hardening assembly are in electrical contact with a controller.

12. A method for induction hardening a workpiece comprising the steps of:

step for fastening a workpiece in a clamping assembly;

step for providing a first hardness testing device to a forward side of an induction hardening head;

step for moving the induction hardening head over the workpiece to induction harden the workpiece;

step for taking a plurality of forward hardness measurements of the workpiece with the first hardness testing device; and step for adjusting the induction hardening head to provide a predetermined hardness profile to the workpiece.

13. An apparatus for induction hardening an elongated workpiece, the apparatus comprising:

means for induction hardening assembly edge of the workpiece;

first means provided to the apparatus for measuring the hardness of the workpiece; and second means provided to the apparatus for measuring the hardness of the workpiece.

* * * * *